Nov. 12, 1940.    H. WILD    2,221,317
ANGLE-MEASURING INSTRUMENT
Filed Jan. 26, 1938
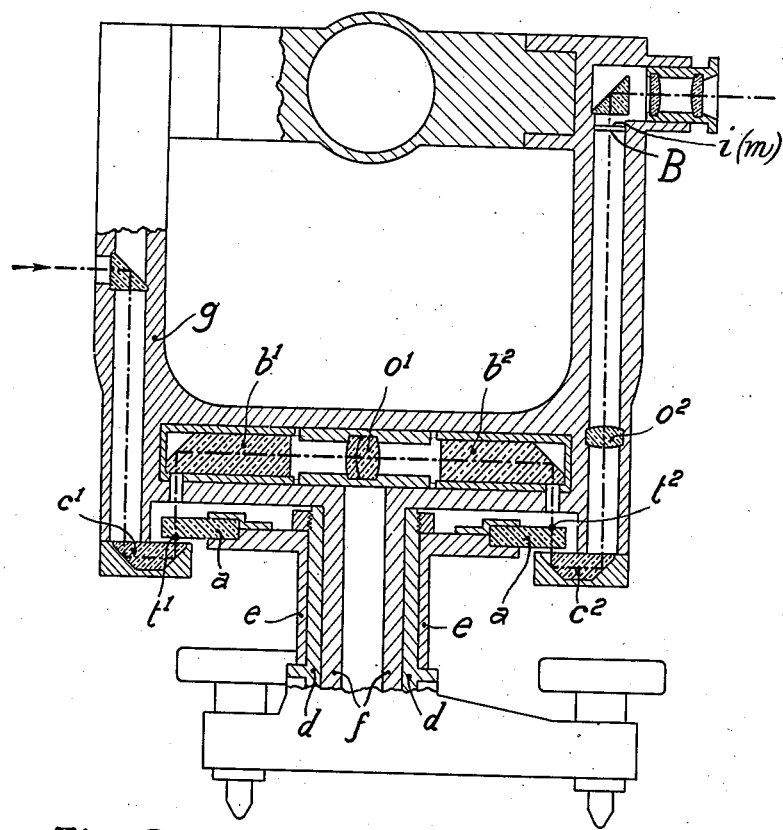
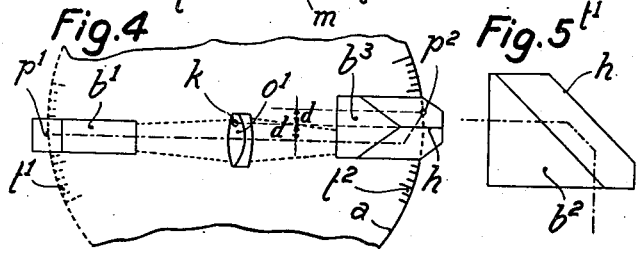
Inventor:
Heinrich Wild Patented Nov. 12, 1940

2,221,317

UNITED STATES PATENT OFFICE 2,221,317

ANGLE-MEASURING INSTRUMENT

Heinrich Wild, Romerburg, Baden, Switzerland

Application January 26, 1938, Serial No. 187,035
In Switzerland January 30, 1937

3 Claims. (Cl. 88—1)

My present invention relates to improvements in circle reading microscopes and appurtenant elements for transits and similar angle-measuring instruments in which one and the same circle is provided with two different graduations and in which two diametrically opposite points of the latter are simultaneously projected into the field of view of only one microscope so that the single reading taken will give the observer the arithmetic mean of the two circle readings; and the objects of my improvement are, first, to provide such graduations for the circle which easily can be distinguished from each other in the common field of view so as to render the single reading as synoptic and simple as possible; second, to provide a special projection system common to both circle positions which comprises a minimum of optical elements; and, third, to align the said projection system with reference to the vertical axis of the instrument in the most practical and advantageous manner.

For the purpose of easy and speedy observation and operation of angle-measuring instruments it has proven highly practical and advantageous to read the two diametrically opposite circle positions with relation to a single graduation through a common microscope, and even to project also the diametrically opposite positions of the vertical circle into the latter's field of view. In such a case it is important that the individual and combined microscope images be made as synoptic and as distinct from each other as possible, since—in contrast to older types of angle-measuring instruments—two or even four images appear in the field of view.

My present invention permits of a substantial simplification of the images in the reading microscope by providing two graduations on one and the same circle plate which do not have to be identical neither with relation to the size of their divisions nor to the manner of designation. Two diametrically opposite points of the said graduations are projected into a single observation microscope so that a reading is fully equivalent—with reference to the elimination of instrument errors and to accuracy—to that observation in which two diametrically opposite points of one and the same graduation are projected into a common field of view.

In my present invention one of the two points of reading is projected into the field of view of the other point by means of a special optical system, and either image may be superimposed onto or incorporated into the other as desired.

When the optical disposition of the special system is such that the divisions of the one image proceed in the same sense as those of the other image and that the former appear immediately adjacent to the latter (Fig. 2), this twin graduation may be read in the common microscope just as a simple graduation, e. g., by means of a micrometer with image displacement or displacement of divisions; the result, however, being the arithmetic mean of the two opposite circle readings. In such a method of projection it is of special importance to leave out the numbering or designation on one of the graduations, as otherwise there would appear upright and reversed ciphers at the same point.

According to the second manner of projection (Fig. 3) no inversion is taking place in the direction of the division so that the two circle images appear to run in opposite directions and only partly interlocked, similar to the known method of coincidental reading, but without separating line.

If in this latter case the interval of the one graduation is made equal to a multiple of the interval of the other graduation, there results a much simpler image than in the case of the usual coincidental reading method, without impairing the accuracy of reading.

The accuracy of reading may be substantially increased—just as in the case of the usual coincidental reading—by providing an optical micrometer, the latter, however, must be disposed within the path of light of the special projection system.

If the graduations are applied to glass, the second graduation advantageously is applied to the rear surface of the glass ring. In such a case the two graduations may be arranged on circles of the same diameter, since the thickness of the glass precludes any disturbance of the one image through the other.

If the two graduations are applied to the same side of the circle, the one graduation may receive a diameter somewhat different from that of the other. In such a case the difference in the sizes of interval is compensated by a slight change in magnification in the projecting system.

It is important for the first or shop adjustment of the relative position of the two images and especially for its permanence that the special projection system comprise as few optical parts as possible. This is attained by the provision of two prisms and a microscope objective disposed in a straight line.

In case of the usual coincidental reading method using such a latter optical system, one of the two prisms must be provided with a roof addition which—in view of the extraordinary fineness of the divisional lines—must normally be executed with extreme accuracy. If, however, the projection system is disposed somewhat eccentrically and if care is taken that each roof face itself receive the full pencil of projecting rays, two divisional lines—which actually lie at diametrically opposite points—may be projected upon each other without the roof having to halve the pencil.

I attain the objects mentioned above by means of the structure and structural elements shown in the accompanying drawing, in which—

Fig. 1 is a vertical axial section through the horizontal circle of an angle-measuring instrument;

Fig. 2 is the image observed in reading the angle by means of a line microscope;

Fig. 3 is the image observed in reading by different division intervals; and

Fig. 4 is a schematical plan view of the special projection system in eccentric disposition.

Fig. 5 is a side elevation, to a larger scale, of the roof addition of prism $b^3$ in Fig. 4.

In Fig. 1, $a$ is the graduated circle provided with the two graduations $t^1$ and $t^2$ on the bottom and top surfaces respectively. $b^1$ and $b^2$ are the two prisms and $o^1$ the microscope objective of the special optical system. The prism $c^1$ serves for illuminating the two opposite circle points. The common reading microscope comprises the prism $c^2$ and the microscope objective $o^2$, and its real image B is observed through an eyepiece.

The horizontal circle axle $e$ and the vertical circle axle $f$ are mounted upon the axle bush $d$ connected with the leveling head. The former axle $e$ is rigidly fastened to the bush $d$, while the latter axle $f$ is rotatively mounted within the said bush $d$. The standard $g$ is rigidly fastened to the vertical axle $f$ and in a recess comprises the special projection system $b^1$—$o^1$—$b^2$. The said standard, furthermore, carries the microscope $c^2$—$o^2$ and the illuminating prism $c^1$.

The said special projection system produces at the point of reading $t^2$ a real picture of equal size from the point of reading $t^1$, so that both said points may be read off by means of the common microscope $c^2$—$o^2$.

The said second circle division $t^2$ may be incorporated in or disposed on the same surface as $t^1$, the radius of the graduation being chosen a few tenths of a millimeter different from the radius of the graduation $t^1$.

In the field of view of the microscope as shown in Fig. 2 the divisions $t^1t^1$ belong to the circle graduation $t^1$, and the divisions $t^2t^2$ to the circle graduation $t^2$, the said two divisions being diametrically opposite. The micrometer index $m$, disposed at the point of the real image B (Fig. 1), serves for accurate reading by being set into the centre of a pair of divisional lines by suitable means.

In the field of view of the microscope as shown in Fig. 3 the divisions $t^1t^1$ correspond to the circle and reading position $t^1$ with 20-minute intervals, and the divisions $t^2t^2$ correspond to the circle position and point of reading $t^2$ with 4-minute intervals. The scale $t^1$ is not numbered, and the scale $t^2$ is numbered consecutively by degrees from 0–360. The fixed index $i$, disposed within the microscope eyepiece at B (Fig. 1), shows the full degrees and the 20-minute units, in the example shown 5° 04'. Any division of the bottom graduation $t^1$ may be used for reading the full minutes and for estimating their tenths. A 4-minute interval of the top graduation $t^2$, then, has to be counted as 2 minutes, in the example shown 2.8 minutes or a total of 5° 42.8'. It may be readily seen that by eliminating the 4-minute divisions in the bottom graduation the reading is made easier, clearer and simpler without impairing the accuracy of reading. If the said 2.8 minutes are measured by means of an optical micrometer, which is disposed within the said special projection system, in such a way that the bottom divisions are made to coincide with the top divisions, we may attain a substantially greater accuracy of reading. In contrast to the method of coincidental reading used heretofore, the two graduations in the field of view according to Fig. 3 are not terminated or cut off by a separating line extending at right angles to the latter. We, therefore, may directly use the roots of the division lines with the well-known tapered tips.

In the plan view according to Fig. 4 the special projection system comprises the prisms $b^1$, $b^2$ and the objective $o^1$. The prism $b^2$ is widened and provided with an end roof $b^3$. The two image axes are displaced symmetrically to the roof gable $h$ to the amount of $2d$, $d$ being eccentricity of the center of the objective $o^1$ relative to the center $k$ of the scales $t^1$ and $t^2$, and each half of the roof may receive the full pencil of projecting rays. The entire projection system is displaced—with relation to the circle centre $k$—to the amount of half the axial displacement, i. e. to the amount $d$, so that the symmetrical transfer is assured. A real image of a point $p^1$ of the graduation $t^1$ is projected onto a point $p^2$ in the graduation $t^2$; the incident and emergent rays (Fig. 5) in the plane of Fig. 4 being axially displaced to the amount of $2d$.

What I claim and desire to secure by Letters Patent is:

1. In an angle-measuring instrument the combination of a leveling head, a vertical bush secured thereto, a frame rotatively mounted in said bush, a horizontal-circle plate fastly mounted to the outside of said bush, a pair of standards for supporting an angle measuring instrument forming a part of said frame, a flat glass ring secured to and projecting from said plate and having two concentric scales of equal diameter on respectively the top and bottom surfaces, one of said scales being numbered consecutively by degrees and divided and subdivided into a certain number of minutes and multiples thereof and the other being non-numbered and divided into corresponding said multiples; and an optical system comprising a central objective lens and two lateral reflecting prisms mounted in a horizontal diametral recess of said frame above said plate to project an image of equal size of a portion of said second scale onto and partly into the diametrically opposite portion of said first scale, a double-reflecting prism mounted in an axial recess of the one said standard below said plate for illuminating the said portions, another double-reflecting prism mounted in an axial recess of the other said standard also below said plate to transmit the lightrays from said prisms and lens upwardly, another objective lens mounted in the latter recess to project an enlarged image of said portions upwardly, an index mark mounted in the image plane of the latter lens, means for throwing light from the outside onto the said first double-reflecting prism, and means for viewing the said enlarged image.

2. In an angle-measuring instrument the combination of a vertical bush secured to the leveling head, a frame rotatively mounted in said bush, a horizontal-circle plate secured to said bush, a pair of standards for supporting an angle measuring instrument forming a part of said frame, a flat glass ring secured to and projecting from said plate and having two concentric scales of slightly different diameters on one and the same surface, one of said scales being numbered consecutively by degrees and divided into multiples of minutes and the other being non-numbered and divided into corresponding said multiples; and an optical system comprising a central objective lens and two lateral reflecting prisms mounted in a horizontal diametral recess of said frame above said plate to project an image of a portion of said non-numbered scale onto and into the diametrically opposite portion of said numbered scale wherein the said multiples of both scales are equal in size, a double-reflecting prism mounted in an axial recess of the one said standard below said plate for illuminating the said portions, another double-reflecting prism mounted in said axial recess of the other said standard also below said plate to transmit the lightrays from said prisms and lens upwardly, another objective lens mounted in the latter recess to project an enlarged image of the said circle portions upwardly, an index mark mounted in the image plane of the latter objective lens, a prism for throwing light from the outside onto the said first double-reflecting prism, and an eyepiece for viewing the said enlarged image.

3. In an angle-measuring instrument the combination of a leveling head, a vertical bush secured thereto, a frame rotatively mounted in said bush, a horizontal circle-plate fastly mounted to the outside of said bush, a pair of standards for supporting an angle measuring instrument forming a part of said frame, a flat glass ring secured to the periphery of said plate and having two concentric scales of equal diameters on respectively the top and bottom surfaces, one of said scales being numbered by degrees and divided and subdivided into multiples of minutes and groups thereof and the other being non-numbered and divided into corresponding said groups; and an optical system comprising a central objective lens and two lateral reflecting prisms mounted in a horizontal diametral recess of said frame above said ring to project an image of equal size of a portion of said second scale onto and partly into the diametrically opposite portion of said first scale, the said lens being disposed with a certain eccentricity to the vertical axis of rotation of the instrument and one of said prisms having a wider base than the other and a roof addition for the purpose of confining the full pencil of rays within either roof-half and of imparting double the amount of said eccentricity to the emergent rays relative to the incident rays, a double-reflecting prism mounted in an axial recess of the one said standard below said ring for illuminating the said portions, another double-reflecting prism mounted in an axial recess of the other said standard also below said ring to transmit the lightrays from said prisms and lens upwardly, another objective lens mounted in the latter recess to project an enlarged image of said portions upwardly, an index mark mounted in the image plane of the latter lens, means for throwing light from the outside onto the said first double-reflecting prism, and an eyepiece for viewing the said enlarged image.

HEINRICH WILD.